(12) United States Patent
Sakaguchi et al.

(10) Patent No.: US 10,262,406 B2
(45) Date of Patent: Apr. 16, 2019

(54) SIMULATOR, SIMULATION METHOD, AND SIMULATION PROGRAM

(71) Applicant: OMRON Corporation, Kyoto-shi, Kyoto (JP)

(72) Inventors: Yasunori Sakaguchi, Takatsuki (JP); Haruna Shimakawa, Kyoto (JP); Katsushige Ohnuki, Kyoto (JP); Ryo Ichimura, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 96 days.

(21) Appl. No.: 15/342,258

(22) Filed: Nov. 3, 2016

(65) Prior Publication Data

US 2017/0140521 A1    May 18, 2017

(30) Foreign Application Priority Data

Nov. 18, 2015 (JP) ................................. 2015-225783

(51) Int. Cl.
*B25J 9/16* (2006.01)
*G06K 9/00* (2006.01)
(Continued)

(52) U.S. Cl.
CPC ........... *G06T 7/0004* (2013.01); *B25J 9/1605* (2013.01); *B25J 9/1697* (2013.01);
(Continued)

(58) Field of Classification Search
None
See application file for complete search history.

(56) References Cited

U.S. PATENT DOCUMENTS

| 6,035,243 A * | 3/2000 | Galuga ............ G05B 19/41805 |
| | | 700/110 |
| 2005/0075752 A1* | 4/2005 | Ban ........................ B25J 9/1697 |
| | | 700/213 |

(Continued)

FOREIGN PATENT DOCUMENTS

| CN | 104002297 A | 8/2014 |
| DE | 10351669 A1 | 6/2005 |

(Continued)

OTHER PUBLICATIONS

The office action dated Oct. 31, 2018 in a counterpart Chinese patent application.

(Continued)

*Primary Examiner* — Kim Y Vu
*Assistant Examiner* — Nathan J Bloom
(74) *Attorney, Agent, or Firm* — Metrolexis Law Group, PLLC

(57) ABSTRACT

A simulator includes a measurement unit that performs image measurement of preliminarily obtained image data corresponding to processing performed using a visual sensor, an execution unit that executes a control operation for generating a control instruction directed to a processing device based on a measurement result obtained by the measurement unit and for generating a read instruction directed to the measurement unit for reading the image data, a storage unit that stores the image data read in response to the read instruction in a manner associated with information indicating a position or a displacement of a carrier serving as a reference for the image measurement performed in response to the read instruction, and a reproduction unit that reproduces a behavior of the created system based on time-series data for the control operation output from the (Continued)

execution unit and the information associated with the image data stored in the storage unit.

9 Claims, 14 Drawing Sheets

(51) Int. Cl.
*G06T 7/00* (2017.01)
*G06T 7/70* (2017.01)
*G05B 19/418* (2006.01)

(52) U.S. Cl.
CPC ... *G05B 19/41885* (2013.01); *G06K 9/00335* (2013.01); *G06T 7/70* (2017.01); *G05B 2219/39031* (2013.01); *G06T 2200/04* (2013.01); *G06T 2207/30108* (2013.01); *Y02P 90/26* (2015.11)

(56) References Cited

U.S. PATENT DOCUMENTS

| | | | |
|---|---|---|---|
| 2006/0048686 A1* | 3/2006 | Watanabe | B23Q 7/1436 108/51.11 |
| 2008/0065367 A1* | 3/2008 | Serizawa | G06F 17/5086 703/13 |
| 2008/0273096 A1* | 11/2008 | Senda | H04N 1/00127 348/231.7 |
| 2008/0301072 A1 | 12/2008 | Nagatsuka et al. | |
| 2009/0128651 A1 | 5/2009 | Maeda et al. | |
| 2010/0305754 A1* | 12/2010 | Ban | B25J 9/0093 700/248 |
| 2012/0229620 A1 | 9/2012 | Ikeda et al. | |
| 2013/0329954 A1* | 12/2013 | Ikeda | G06T 1/0007 382/103 |
| 2014/0236356 A1 | 8/2014 | Kuwahara | |
| 2015/0161808 A1 | 6/2015 | Oya et al. | |
| 2016/0199981 A1* | 7/2016 | Atohira | B25J 9/1671 700/248 |
| 2017/0235300 A1* | 8/2017 | Maruno | G06T 7/74 700/112 |
| 2017/0236262 A1* | 8/2017 | Ohnuki | G06T 7/74 700/30 |
| 2019/0001573 A1* | 1/2019 | Gulbrandsen | B29C 64/393 |

FOREIGN PATENT DOCUMENTS

| | | |
|---|---|---|
| EP | 1881383 A2 | 1/2008 |
| EP | 2793183 A1 | 10/2014 |
| EP | 2843556 A1 | 3/2015 |
| JP | 2002-297226 A | 10/2002 |
| JP | 2009-123069 A | 6/2009 |
| JP | 2012-187651 A | 10/2012 |
| JP | 2013-097514 A | 5/2013 |
| JP | 2013-191128 A | 9/2013 |

OTHER PUBLICATIONS

The office action dated Sep. 5, 2018 in a counterpart Japanese patent application.

* cited by examiner

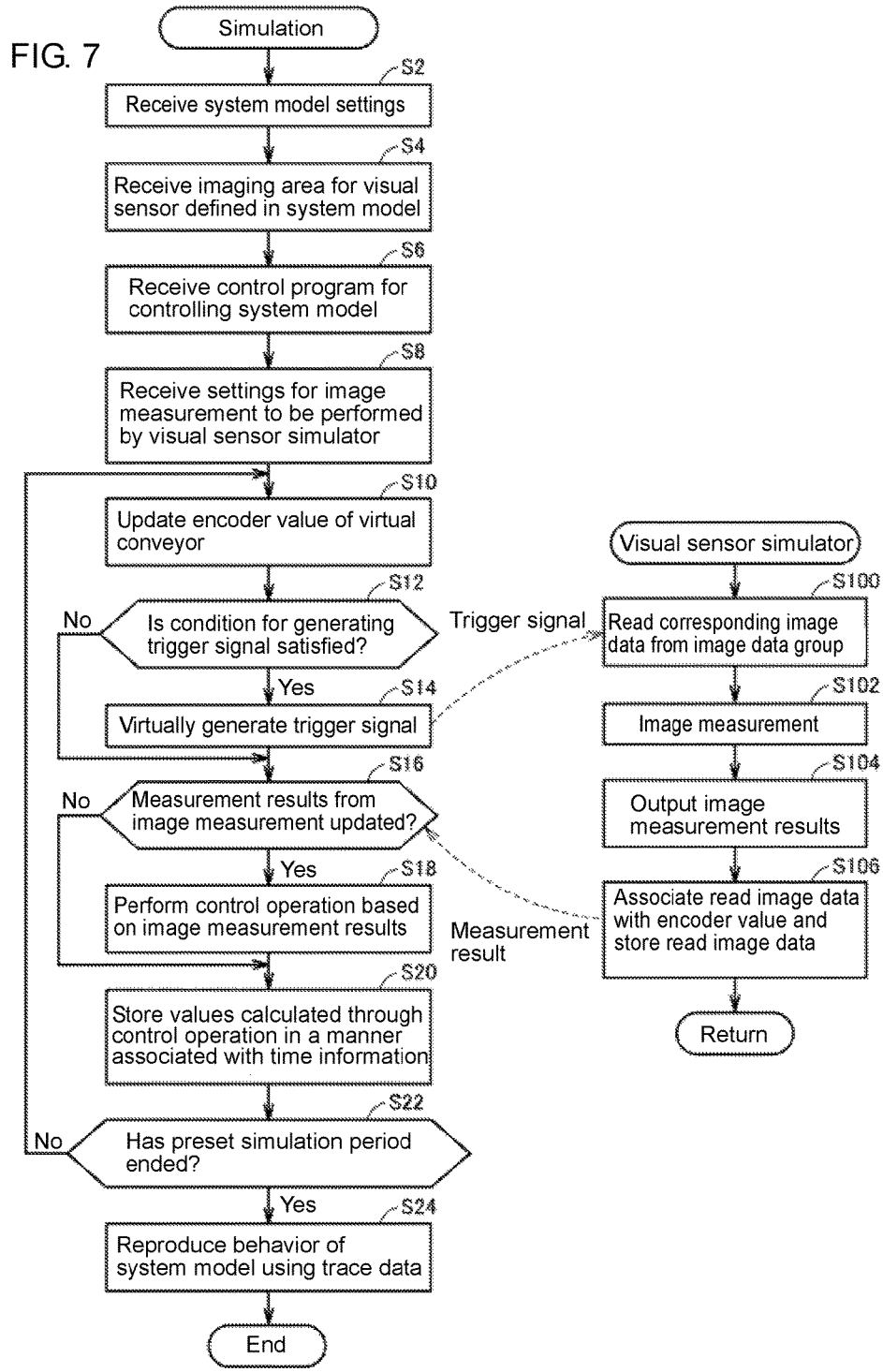

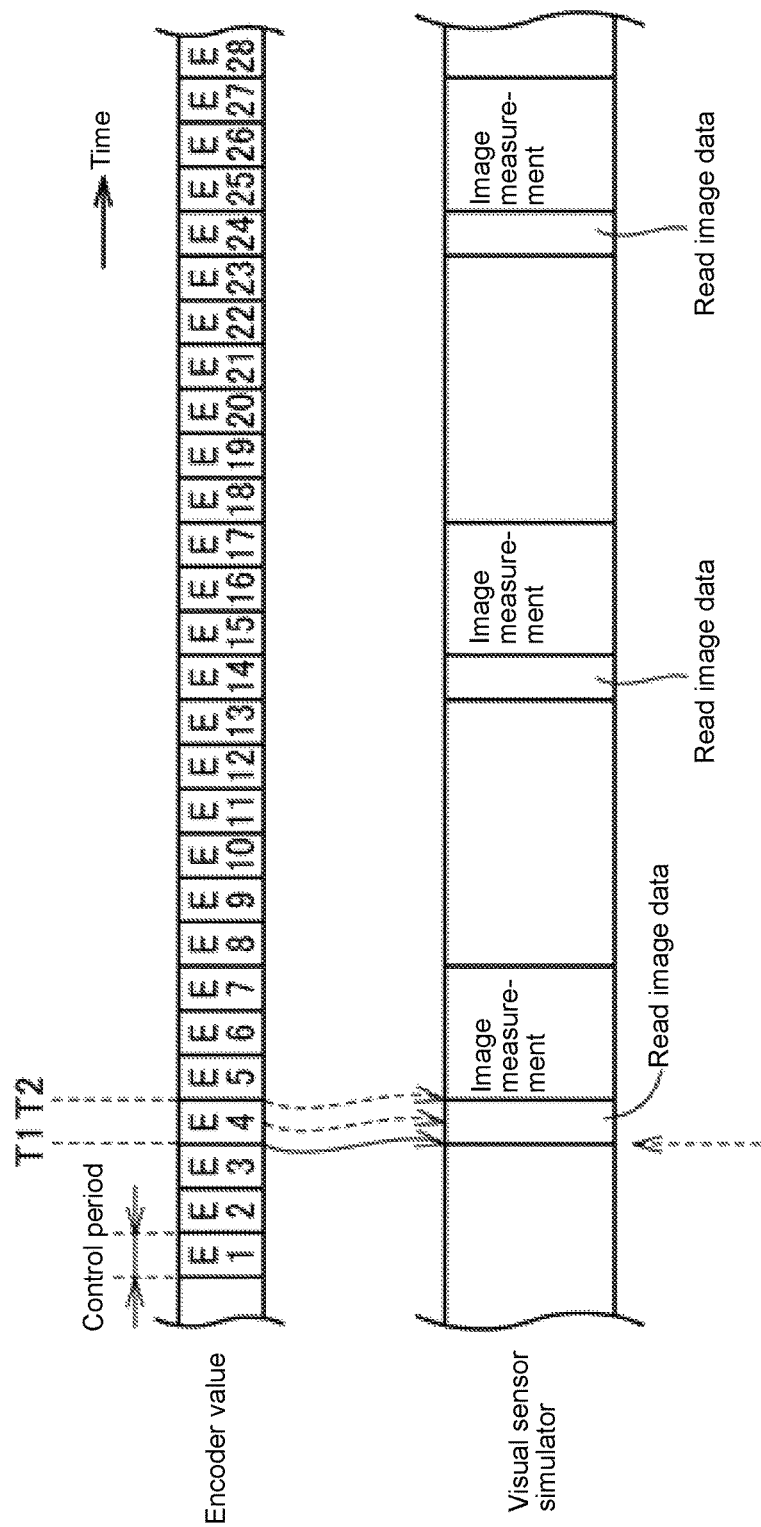

SIMULATOR, SIMULATION METHOD, AND SIMULATION PROGRAM

CROSS-REFERENCE TO RELATED APPLICATION

This application claims priority from prior Japanese Patent Application No. 2015-225783 filed with the Japan Patent Office on Nov. 18, 2015, the entire contents of which are incorporated herein by reference.

FIELD

The present invention relates to a simulator, a simulation method, and a simulation program for estimating the behavior of a system.

BACKGROUND

In the field of factory automation (FA), automatic control techniques using visual sensors are used widely. Such techniques include automatic processing in which an image of a target such as a workpiece is captured, the captured image undergoes image measurement such as pattern matching, and various control devices operate based on the measurement results.

For example, Japanese Unexamined Patent Application Publication No. 2012-187651 (Patent Literature 1) describes conveyor tracking involving a visual sensor and a robot. A system for such conveyor tracking includes the visual sensor and a robot controller for controlling the robot connected to each other with a network.

Designing or examining the system to be controlled with the above automatic control technique may need preliminary evaluation of the performance of the entire system. In response to this, a technique has been developed for virtually creating a system and simulating its operation. For example, Japanese Unexamined Patent Application Publication No. 2013-191128 (Patent Literature 2) describes a technique for integrated simulations of a mechanical system including a visual sensor in a real space corresponding to a virtual imaging unit. With the technique described in Patent Literature 2, a 3D simulator and a visual sensor simulator cooperate with each other to virtually generate captured images of a workpiece in a 3D space at predetermined timings.

CITATION LIST

Patent Literature

Patent Literature 1: Japanese Unexamined Patent Application Publication No. 2012-187651
Patent Literature 2: Japanese Unexamined Patent Application Publication No. 2013-191128

The technique described in Patent Literature 2 further involves predefining of workpieces or targets. When, for example, the existing system is to be improved or when the existing system is to be replaced with another system, workpieces are also to be modeled.

A structure for more efficient simulation of a system using preliminary obtained image data for a target such as a workpiece is to be developed. Further, the timing for image measurement of the image data is also to be simulated more precisely.

Solution to Problem

A simulator according to one aspect of the present invention estimates a behavior of a system. The simulator includes a creating unit that virtually creates a system including a carrier in a three-dimensional virtual space. The created system includes a visual sensor virtually located at a first position on a transporting path associated with the carrier, and a processing device virtually located at a second position on the transporting path. The simulator includes a measurement unit, an execution unit, a storage unit, and a reproduction unit. The measurement unit performs image measurement of preliminarily obtained image data corresponding to processing performed using the visual sensor. The execution unit executes a control operation for generating a control instruction directed to the processing device based on a measurement result obtained by the measurement unit and for generating a read instruction directed to the measurement unit for reading the image data. The storage unit stores the image data read in response to the read instruction in a manner associated with information indicating a position or a displacement of the carrier. The position or the displacement serves as a reference for the image measurement performed in response to the read instruction. The reproduction unit reproduces a behavior of the created system based on time-series data for the control operation output from the execution unit and the information associated with the image data stored in the storage unit. The reproduction herein refers to a computation performed by the simulator for creating the system in the virtual space and causing the system to operate virtually. The reproduction includes simulation.

In some embodiments, the measurement unit outputs, to the execution unit, the measurement result together with the information indicating the position or the displacement of the carrier associated with the image data used to generate the measurement result.

In some embodiments, the execution unit executes the control operation using a position of a target in the three-dimensional virtual space corrected based on the information indicating the position or the displacement of the carrier provided together with the measurement result.

In some embodiments, the execution unit calculates an amount of correction for the position of the target based on a difference between the information indicating the position or the displacement of the carrier provided together with the measurement result and information indicating the position or the displacement of the carrier during execution of the control operation.

In some embodiments, the reproduction unit displays the behavior of the created system and the image data that has undergone the image measurement.

In some embodiments, the reproduction unit corrects a display position of the target based on the information indicating the position or the displacement of the carrier provided together with the measurement result.

In some embodiments, the simulator further includes a generating unit that generates information indicating the position or the displacement of the carrier in a manner associated with movement of the carrier.

In some embodiments, the storage unit associates the information with a file name of the image data or an area included in the image data.

A simulation method according to another aspect of the present invention is implemented by a computer to estimate a behavior of a system. The simulation method includes virtually creating a system including a carrier in a three-dimensional virtual space. The created system includes a visual sensor virtually located at a first position on a transporting path associated with the carrier, and a processing device virtually located at a second position on the transporting path. The method includes performing image measurement of preliminarily obtained image data corresponding to processing performed using the visual sensor, executing a control operation for generating a control instruction directed to the processing device based on a measurement result obtained from the image measurement and for generating a read instruction for reading the image data to start the image measurement, storing the image data read in response to the read instruction in a manner associated with information indicating a position or a displacement of the carrier serving as a reference for the image measurement performed in response to the read instruction, and reproducing a behavior of the created system based on time-series data for the control operation output as a result of the executing process and information associated with the stored image data.

A simulation program according to another aspect of the present invention is used to estimate a behavior of a system. The simulation program causes a computer to implement virtually creating a system including a carrier in a three-dimensional virtual space. The created system includes a visual sensor virtually located at a first position on a transporting path associated with the carrier, and a processing device virtually located at a second position on the transporting path. The program causes the computer to implement performing image measurement of preliminarily obtained image data corresponding to processing performed using the visual sensor, executing a control operation for generating a control instruction directed to the processing device based on a measurement result obtained from the image measurement and for generating a read instruction for reading the image data to start the image measurement, storing the image data read in response to the read instruction in a manner associated with information indicating a position or a displacement of the carrier serving as a reference for the image measurement performed in response to the read instruction, and reproducing a behavior of the created system based on time-series data for the control operation output as a result of the executing process and information associated with the stored image data.

Advantageous Effects

Embodiments of the present invention allow more precise simulation of a system using preliminary obtained image data for a target such as a workpiece.

BRIEF DESCRIPTION OF THE DRAWINGS

FIG. 7 is a flowchart showing the procedure of simulation performed by the simulator according to the embodiment.

FIG. 8 is a schematic diagram describing information serving as a reference used for image measurement performed by the simulator according to the embodiment.

DETAILED DESCRIPTION

Figure 1:
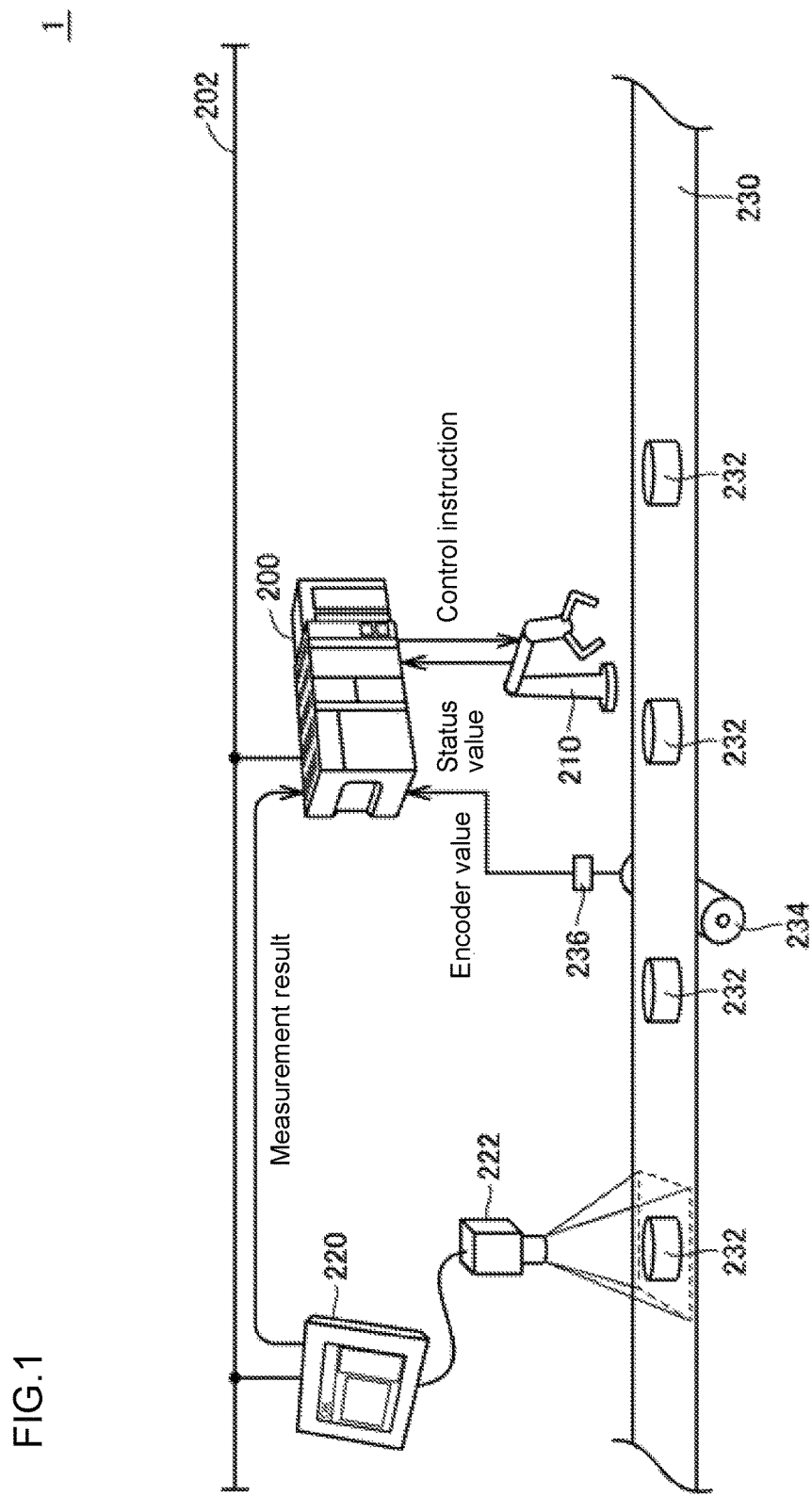
FIG. 1 is a schematic diagram showing the configuration of a system to be simulated by the simulator according to one embodiment.

Embodiments of the present invention will now be described in detail with reference to the drawings. The same or corresponding components in the figures are given the same reference numerals, and will not be described redundantly.

A. Overview

A simulator according to the present embodiment estimates the behavior of a system. More specifically, the simulator according to the present embodiment estimates the behavior of a virtually created system using image data representing images actually captured by an imaging unit. Although the simulator simulates a conveyor tracking system including one or more devices in the embodiment described below, the simulator may simulate any other system.

The simulation performed by the simulator according to the present embodiment will now be described briefly.

FIG. 1 is a schematic diagram showing the configuration of a system to be simulated by the simulator according to the present embodiment. As shown in FIG. 1, for example, a conveyor tracking system 1 includes a robot 210, which picks up a workpiece 232 transported continuously on a conveyor 230, and transfers to and places the workpiece 232 at a predetermined position. The robot 210 is one example of a processing device. The workpiece 232 is one example of a target. This series of actions performed by the robot 210, or picking, transferring, and placing, may be referred to as the pick-and-place operation.

In the embodiment described below, the conveyer is an example of a carrier, the workpiece is an example of a target, and the robot is an example of a processing device that processes the target. The target and the processing device may not be limited to these examples, and may be selected as appropriate in accordance with the system to be simulated.

To enable the pick-and-place operation of the robot 210, an imaging unit 222 captures an image of an imaging area defined on a part of the conveyor 230, and a visual sensor 220 performs image measurement including pattern matching of the image data captured by the imaging unit 222 and obtains the measurement results including information about the position, orientation, and other parameters of the workpiece 232. A controller 200 executes a predetermined control logic based on the measurement results obtained by the visual sensor 220 to generate a control instruction for the robot 210. To generate the control instruction for the robot 210, the controller 200 refers to the status value of the robot 210, and an encoder value provided from an encoder 236, which is connected to a drive roller 234 for driving the conveyor 230. The controller 200 and the visual sensor 220 are connected to each other with a network 202 to allow data communication between them. The measurement results are transmitted from the visual sensor 220 to the controller 200 through the network 202. The controller 200 typically includes a programmable logic controller (PLC).

The conveyor tracking system 1 shown in FIG. 1 may examine its processing capability by increasing the moving speed of the conveyor 230 and including an additional robot 210.

Figure 2:
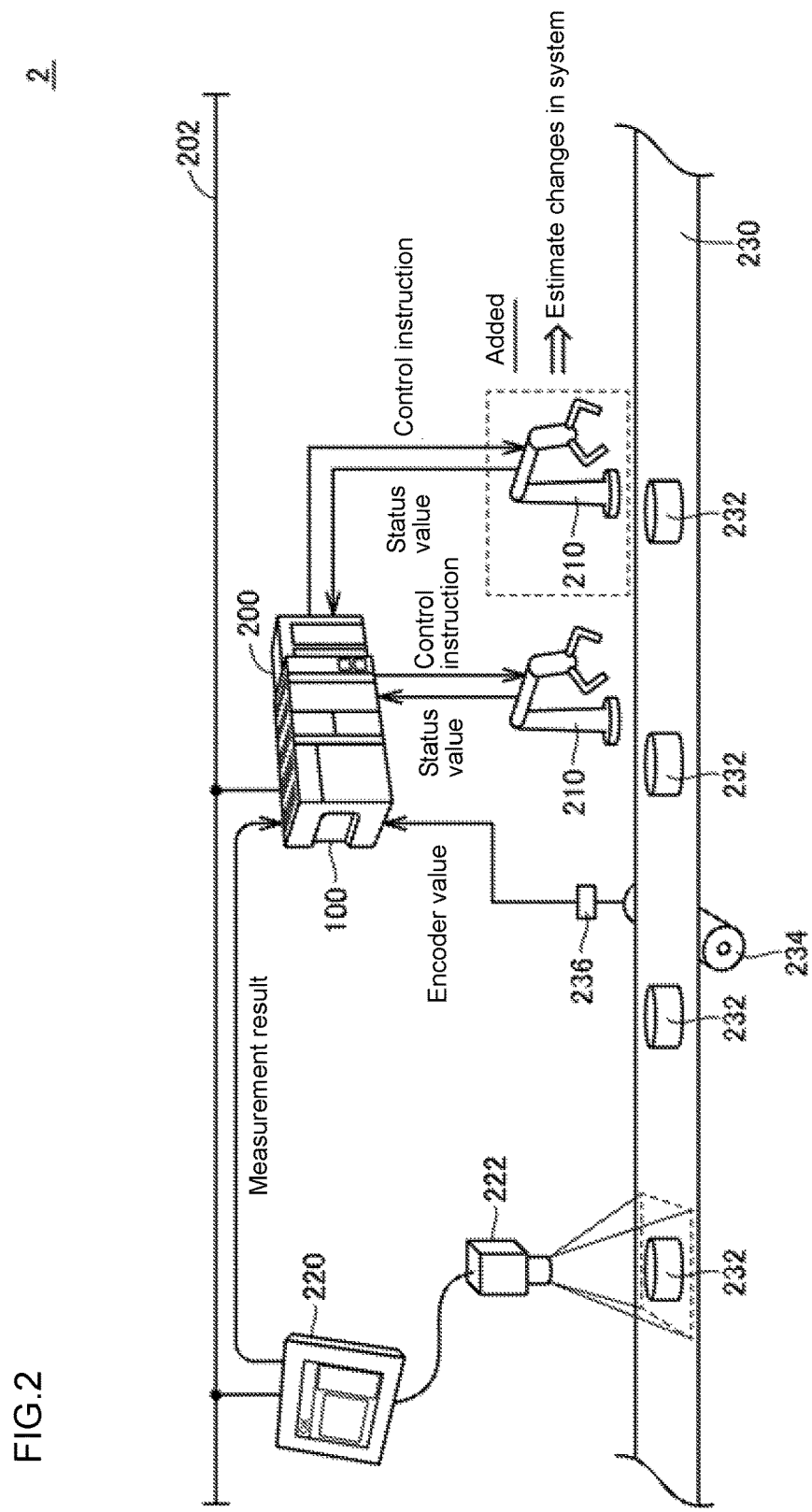
FIG. 2 is a schematic diagram showing the configuration of a manufacturing system including a robot added to the configuration of the manufacturing system shown in FIG. 1.

FIG. 2 is a schematic diagram showing the configuration of a conveyor tracking system 2 including a robot 210 added to the configuration of the conveyor tracking system 1 shown in FIG. 1. Although actually adding the robot 210 to the system as shown in FIG. 2 and checking its processing capability may be intended, actually installing the system is often difficult due to the cost or time constraints. The simulator is to be designed to achieve simpler estimation of changes in the system caused by such an additional device as shown in FIG. 2.

In response to this, the simulator according to the present embodiment virtually creates a system to be simulated in a three-dimensional virtual space, and combines the virtually created system with actually captured image data to achieve more efficient simulation.

Figure 3:
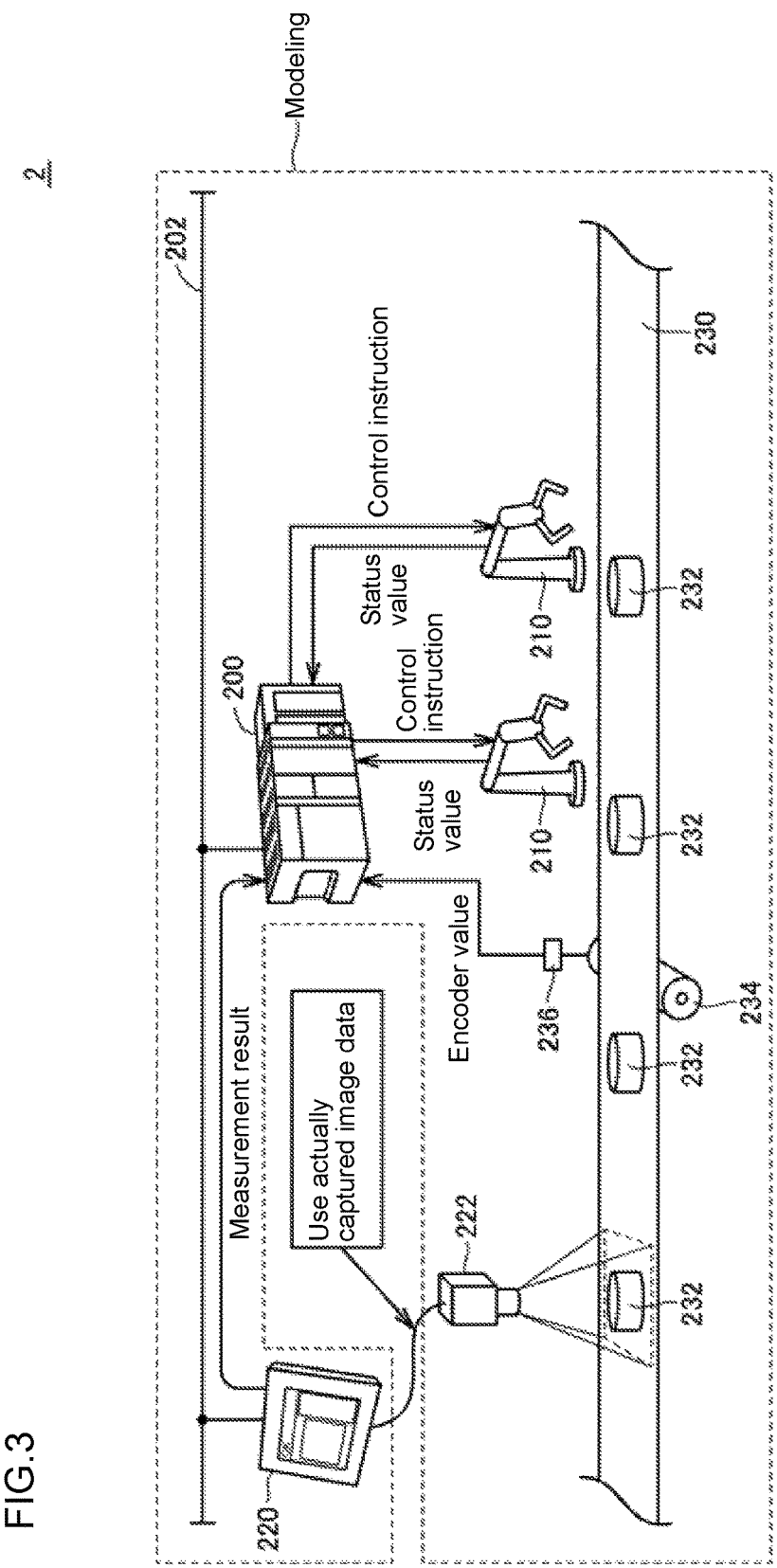
FIG. 3 is a schematic diagram describing a simulation method implemented by the simulator according to the embodiment.

FIG. 3 is a schematic diagram describing a simulation method implemented by the simulator according to the present embodiment. With reference to FIG. 3, the simulator models the entire conveyor tracking system 2, which is to be simulated, and incorporates image data representing an image captured by the imaging unit 222 into this system model. In other words, the simulator uses the actually captured image data in the model of the conveyor tracking system 1.

The simulator with this structure simulates the performance of any manufacturing system while incorporating the state of the actual manufacturing system.

The actually captured image data may not be the data captured in the conveyor tracking system 1 shown in FIGS. 1 and 2 that has yet to be improved, and may be data representing any image captured by any system or under any situation. In other words, the image data may be any data including chronological change information about a target to be simulated (typically, a workpiece 232).

The Image data may be moving image data or data representing a plurality of still images arranged chronologically. The reproduction speed of the moving image data or the update frequency of the data representing the still images can be adjusted as appropriate to adjust the chronological changes (or the moving speed) of a workpiece to be controlled. Adjusting the image data incorporated in the system model in this manner allows the simulation to yield an optimal value for the chronological changes of the control target.

Additionally, still images that are not captured sequentially but are captured in different situations may be arranged as chronologically changing images and used as moving image data. Although the images generated in this case have no overlapping between them, this causes substantially no problem in performing the simulation.

The structure including the visual sensor 220 and the controller 200 connected to each other with a network as shown in FIGS. 1 to 3 can have a delay (time lag) between the timing when image measurement is performed by the visual sensor 220 and the timing when the results from the image measurement reach the controller 200.

Figure 4:
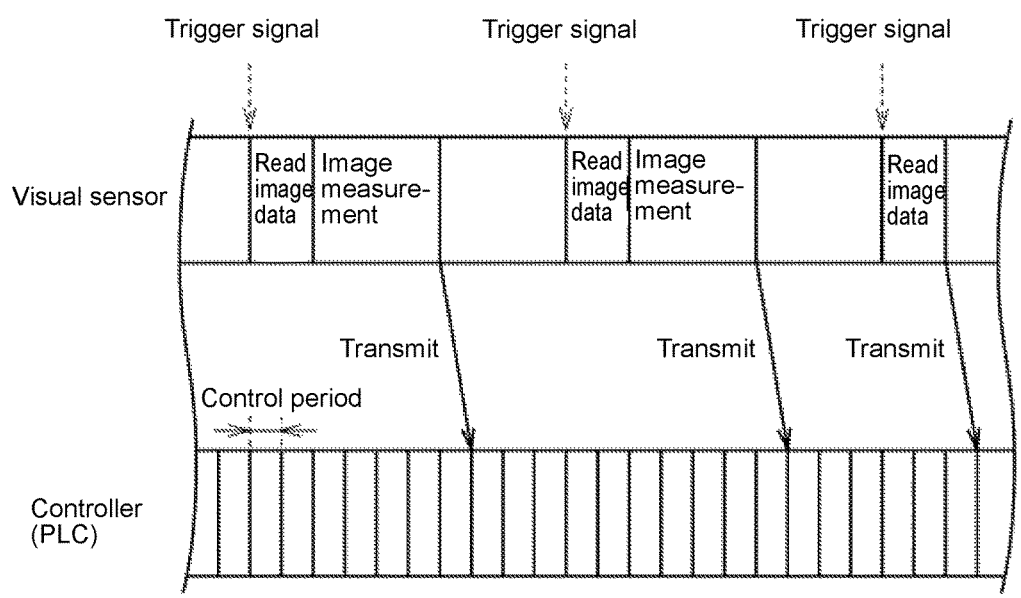
FIG. 4 is a schematic diagram showing a procedure performed in a system including a visual sensor and a controller.

FIG. 4 is a schematic diagram showing a procedure performed in the system including a visual sensor and a controller. Referring now to FIG. 4, for example, the visual sensor 220 reads image data in response to a trigger signal from an external unit, and performs image measurement of the read image data. The measurement results from the image measurement are transmitted to the controller 200. When the total of the time taken for the image measurement and the delay time taken for the transmission shown in FIG. 4 is negligible, this can cause no problems. However, as the control period for the visual sensor 220 is longer, the delay time may not be negligible.

In the conveyor tracking system shown in FIGS. 1 to 3 in which a target (typically, a workpiece 232) moves, a delay time that is not negligible would prevent the robot from correctly performing its pick-and-place operation.

In response to this, the simulator 100 according to the present embodiment corrects an error caused by that delay time and executes a control logic for controlling the robot.

B. Hardware Configuration of Simulator

The hardware configuration of the simulator 100 according to the present embodiment will now be described. The simulator 100 according to the embodiment is implemented typically by one or more computers executing a program.

Figure 5:
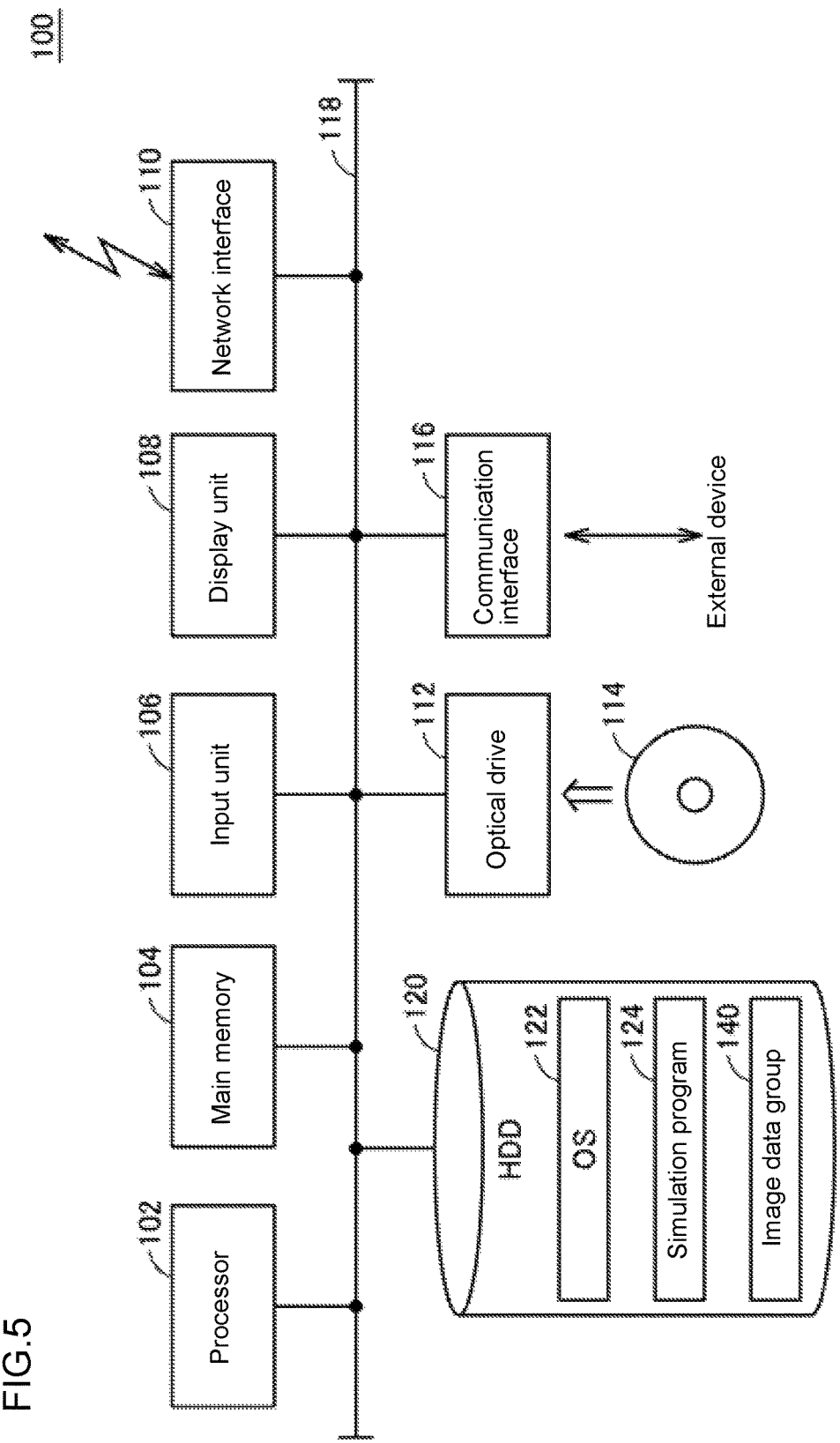
FIG. 5 is a schematic diagram showing the hardware configuration of the simulator according to the embodiment.

FIG. 5 is a schematic diagram showing the hardware configuration of the simulator 100 according to the present embodiment. With reference to FIG. 5, the simulator 100 is, for example, a computer having the general-purpose computer architecture. The simulator 100 includes a processor 102, a main memory 104, an input unit 106, a display unit 108, a network interface 110, a hard disk drive (HDD) 120, an optical drive 112, and a communication interface 116. These components are connected to each other with an internal bus 118 in a communicable manner.

The processor 102 loads a program stored in the hard disk drive 120 into the main memory 104 and executes the program to implement the functions and the processing described later. The main memory 104 is a volatile memory and functions as a working memory used for program execution by the processor 102.

The input unit 106 typically includes a keyboard, a mouse, a touch panel, and a touchpad, and receives a user operation. The display unit 108 includes a display and an indicator, and presents various pieces of information to a user.

The network interface 110 exchanges data with external devices such as a server through a network. The optical drive 112 reads various programs from an optical disc 114 or other media, and installs the programs into the hard disk drive 120. The communication interface 116 is, for example, a universal serial bus (USB) communication interface, and exchanges data with external devices such as an auxiliary storage through local communications.

The hard disk drive 120 stores an operating system (OS) 122, a program for providing the functions of the simulator, such as a simulation program 124, and also stores a preliminarily obtained image data group 140 used for simulation.

Although an intended program is installed in the simulator 100 via the optical drive 112 in the configuration example shown in FIG. 5, a program may be downloaded from a server or other devices on the network.

When the simulator is a general-purpose computer as described above, an OS may be installed on the computer to provide the basic function of the computer, in addition to a program for providing the functions according to the present embodiment. In this case, the simulation program according to the present embodiment may call program modules included in the OS in a predetermined order and/or at predetermined timings as appropriate to perform processing. More specifically, the program according to the present embodiment may not include these program modules and may cooperate with the OS to perform processing. The program according to the present embodiment may not include such modules.

The program according to the present embodiment may be incorporated as a part of another program to be combined. The program according to the present embodiment may not thus include modules of the program to be combined, and may cooperate with the program to achieve processing. In other words, the simulation program according to the present embodiment may be incorporated in the other program.

Although FIG. 5 shows the simulator 100 that is a general-purpose computer, the simulator 100 may be partly or entirely implemented using a dedicated circuit (e.g., an application specific integrated circuit, or ASIC). Additionally, an external device may perform a part of the processing of the simulator 100.

C. Functional Structure of Simulator

Figure 6:
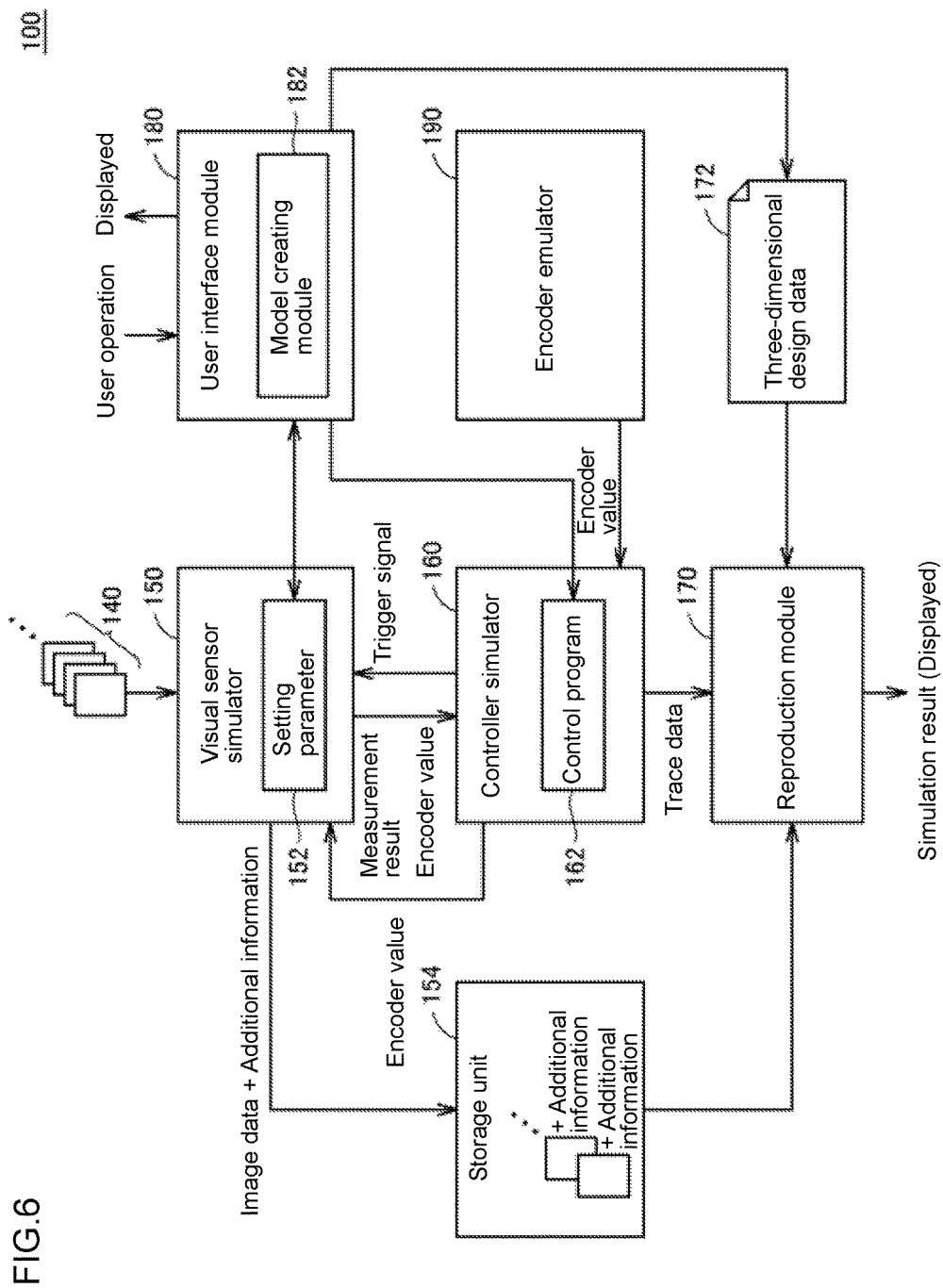
FIG. 6 is a schematic diagram showing the functional structure of the simulator according to the embodiment.

The functional structure of the simulator 100 according to the present embodiment will now be described. FIG. 6 is a schematic diagram showing the functional structure of the simulator 100 according to the present embodiment.

The simulator 100 shown in FIG. 6 includes a visual sensor simulator 150, a controller simulator 160, a reproduction module 170, a user interface module 180, and an encoder emulator 190 as software functions. This group of functional modules is typically implemented by the processor 102 executing the simulation program 124 (refer to FIG. 5). The simulator 100 further includes a storage unit 154. The storage unit 154 is a storage area in the hard disk drive 120 included in the simulator 100.

The user interface module 180 provides an operation screen for aiding the user to set and generate a setting parameter 152, a control program 162, and three-dimensional design data 172. The user interface module 180 also provides any user interface used when the reproduction module 170 displays simulation results.

The user interface module 180 includes a model creating module 182 for handling the three-dimensional design data 172. The model creating module 182 virtually creates the system to be simulated in a three-dimensional virtual space. More specifically, the model creating module 182 displays a three-dimensional virtual space, and provides a setting and operation screen for creating the system to be simulated in the three-dimensional virtual space.

The simulator 100 according to the present embodiment typically creates a system including a carrier (typically, a conveyor) virtually in a three-dimensional virtual space. As shown in FIG. 3, the system model includes the visual sensor 220 virtually located at a first position on a transporting path associated with the carrier (conveyor), and the controller 200 virtually located at a second position on the transporting path.

The visual sensor simulator 150 is a module for simulating the processing performed by the visual sensor 220, and performs various image measurements of preliminarily obtained image data. More specifically, in response to a read instruction (typically, a trigger signal) from the controller simulator 160, the visual sensor simulator 150 reads the corresponding image data from the preliminarily obtained image data group 140, and performs the image measurement corresponding to the processing performed by the visual sensor 220 (refer to FIGS. 1 to 3). The measurement results from the image measurement performed by the visual sensor simulator 150 are output to the controller simulator 160. The output processing corresponds to the transmission of the measurement results obtained by the visual sensor 220 to the controller 200 through the network 202 in the conveyor tracking system shown in FIGS. 1 to 3. The image measurement in the visual sensor simulator 150 is performed in accordance with a predetermined setting parameter 152.

The controller simulator 160 executes a control operation for generating a control instruction for a robot, which is an example of the processing device, based on the measurement results from the visual sensor simulator 150. The controller simulator 160 is a module for simulating the processing in the controller 200 (refer to FIGS. 1 to 3), and executes a control operation (a sequence instruction, a motion instruction, or various functional instructions) in accordance with the preliminarily created control program 162. Trace data including input and output associated with the control operation executed in the controller simulator 160 is output to the reproduction module 170 as time-series data.

The control operation executed in the controller simulator 160 includes processing for generating a read instruction (trigger signal) for reading image data, which is to be transmitted to the visual sensor simulator 150. More specifically, when a predetermined condition is satisfied, the controller simulator 160 generates a trigger signal. The predetermined condition is, for example, that the conveyor has moved by a predetermined distance, or a predetermined period has ended. As described later, the distance by which the conveyor has moved is determined based on information generated by the encoder emulator 190. The information generated by the encoder emulator 190 is also provided from the controller simulator 160 to the visual sensor simulator 150.

The reproduction module 170 reproduces the behavior of the created system based on time-series data (trace data) for a control operation output from the controller simulator 160. More specifically, the reproduction module 170 uses the three-dimensional design data 172, which is a definition file, to visualize the system virtually created in the three-dimensional virtual space, and also uses the trace data provided from the controller simulator 160 to reproduce the chronological changes of the workpiece or the robot in the system. In this manner, the reproduction module 170 represents the chronological changes of the simulation results in the form of animation or a moving image on the display unit 108 of the simulator 100 (FIG. 5).

The reproduction module 170 may incorporate image data stored in the storage unit 154 and information associated with the image data in reproducing the simulation results. For example, the reproduction module 170 may correct the display position of a target (workpiece) based on information indicating the position or the displacement of the carrier (conveyor) provided together with the measurement results.

Although FIG. 6 show the example in which the reproduction module 170 reproduces the behavior of the created system using the trace data output from the controller simulator 160, the simulator 100 may not include the reproduction module 170. For example, the trace data from the controller simulator 160 may be output to an external device or an external application, and the external device or the external application may reproduce the behavior of the system. In some embodiments, the reproduction module 170 may simply generate and store moving image data for reproducing the behavior of the system in any storage medium, which may then be reproduced by another application.

The encoder emulator 190 generates information indicating the position or displacement of the carrier in a manner associated with the movement of the carrier. In one example, the encoder emulator 190 may output the encoder value indicating a displacement from a reference position, or may generate pulses proportional to a movement of the carrier (conveyor) per unit time. In this case, the encoder value indicates the position of the conveyor, and the number of pulses per unit time indicates the speed of the conveyor.

The storage unit 154 stores image data read in response to a read instruction (trigger signal) in a manner associated with information indicating the position or the displacement of the carrier (conveyor) serving as a reference for the image measurement performed in response to the read instruction. When, for example, the encoder emulator 190 outputs an encoder value, the reference for the image measurement may be the encoder value at the timing when the trigger signal is input into the visual sensor simulator 150, or may be the encoder value at the timing when the visual sensor simulator 150 reads the image data. The read image data is associated with the information serving as the reference of the image measurement and then is stored into the storage unit 154.

The image data that has undergone the image measurement is associated with such additional information as described above. This allows correction of a delay time that is not negligible in the control simulator 160 when that delay time occurs before the processing using the measurement results from the image measurement is started.

D. Procedure

The procedure of simulation performed by the simulator 100 according to the present embodiment will now be described.

FIG. 7 is a flowchart showing the procedure of simulation performed by the simulator 100 according to the present embodiment. With reference to FIG. 7, the simulator 100 first receives the settings of the system model (step S2). The settings of the system model include the arrangement of the devices included in the system, and the moving speed of the conveyor, which is a carrier. Based on these system model settings, the simulator 100 (model creating module 182) virtually creates a system to be simulated in a three-dimensional virtual space.

The simulator 100 (user interface module 180) receives an imaging area for a visual sensor defined in the system model (step S4). Based on the relative positional relationship between the created system and the defined imaging area, the simulator calculates a calibration parameter, which is a transform parameter for transforming the measurement results into an input value for a control operation.

As shown in FIG. 6, although the user interface module 180 calculates the calibration parameter in the example described below, the visual sensor simulator 150 may calculate the calibration parameter.

The simulator 100 (user interface module 180) then receives a control program for controlling the system model (step S6). The control program is associated with the system, and is to be executed by the controller simulator 160.

The simulator 100 (user interface module 180) receives the settings for image measurement to be performed by the visual sensor simulator 150 (step S8).

This processing completes the settings for the simulation.

When instructed to start the simulation, the simulator 100 (encoder emulator 190) updates an encoder value indicating the position or displacement of a virtual conveyor at specified time intervals (step S10). The simulator 100 (controller simulator 160) determines whether a condition for generating a trigger signal is satisfied (step S12). When the condition is satisfied (Yes in step S12), the simulator 100 virtually generates a trigger signal (step S14). When the condition is not satisfied (No in step S12), the processing in step S14 is skipped.

In response to the generated trigger signal, the simulator 100 (visual sensor simulator 150) reads the corresponding image data from the preliminarily obtained image data group (step S100), and performs the image measurement (step S102). After the image measurement, the simulator 100 (visual sensor simulator 150) outputs the measurement results (step S104), and associates the read image data with the encoder value provided from the encoder emulator 190 when the image data is read, and stores the read image data (step S106). The processing in steps S100 to S106 is performed independently of the processing performed in the controller simulator 160.

Subsequently, the simulator 100 (controller simulator 160) determines whether the measurement results from the image measurement have been updated (step S16). More specifically, the simulator 100 determines whether new measurement results have been received from the visual sensor simulator 150. When the measurement results have been updated (Yes in step S16), the simulator 100 (controller simulator 160) executes a control operation based on the updated measurement results (step S18). When the measurement results have not been updated (No in step S16), the processing in step S18 is skipped.

The simulator 100 (controller simulator 160) stores values calculated through the control operation in a manner associated with the corresponding chronological information (step S20). In other words, the simulator 100 stores trace data, which is an example of time-series data.

The simulator 100 determines whether a preset simulation period has ended (step S22). When the simulation period has not ended (No in step S22), the processing in step S10 and subsequent steps is repeated.

When the preset simulation period has ended (Yes in step S22), the simulator 100 reproduces the behavior of the system model using the trace data sequentially stored in step S20 (step S24). The simulator 100 can change the time intervals and the update frequency of the behavior of the reproduced system model as appropriate in accordance with a user operation.

With the procedure described above, a tact time or other performance of the system model can be evaluated.

E. Information Indicating Carrier Position or Displacement Serving as Reference for Image Measurement The information indicating the carrier (conveyor) position or displacement serving as a reference for the image measurement performed in response to a read instruction (trigger signal) will now be described.

FIG. 8 is a schematic diagram describing information serving as a reference used for image measurement performed by the simulator 100 according to the present embodiment. Referring to FIG. 8, the visual sensor simulator 150 reads image data in response to a trigger signal internally generated by the controller simulator 160, and performs image measurement of the read image data. As shown in FIG. 8, the trigger signal is generated at time T1, and the visual sensor simulator 150 then starts reading the image data. The visual sensor simulator 150 completes its image data reading, and starts the image measurement at time T2.

The information indicating the carrier (conveyor) position or displacement serving as a reference for the image measurement may be an encoder value at the input of the trigger signal into the visual sensor simulator 150 (at time T1) (an encoder value E3 in the example shown in FIG. 8). The information may be an encoder value at the start of the image measurement (at time T2) after the image data reading completes (an encoder value E4 in the example shown in FIG. 8).

In some embodiments, the information may be the average value of the encoder values output during the image data reading. For example, when image data is read between times T1 and T2, the average value of the encoder value E3 at time T1 and the encoder value E4 at time T2 ((E3+E4)/2) may be used.

The reference information described with reference to FIG. 8 is one example, and may be any information that can be used to determine the position or the timing at which image data corresponding to the measurement results has been captured after the image data undergoes the image measurement.

F. Storage of Image Data Associated with Information Indicating Carrier Position or Displacement The processing for storing image data into the storage unit 154 (FIG. 6) in the simulator 100 will now be described. The simulator 100 according to the present embodiment stores the image data read in response to an internally generated trigger signal (read instruction) in a manner associated with the information indicating the conveyor (carrier) position or displacement serving as a reference for the image measurement performed in response to the read instruction.

The image data may be associated with the information indicating the conveyor (carrier) position or displacement serving as a reference for the image measurement with any method that allows the information to be used later. A few typical methods will now be described.

Figure 9A:
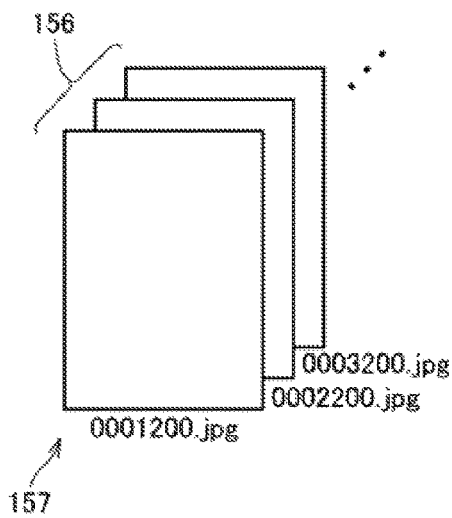
FIGS. 9A to 9C are diagrams each describing a method for storing image data used by the simulator according to the embodiment.
Figure 9B:
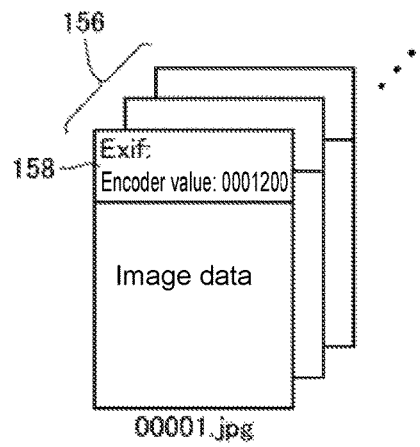
Figure 9C:
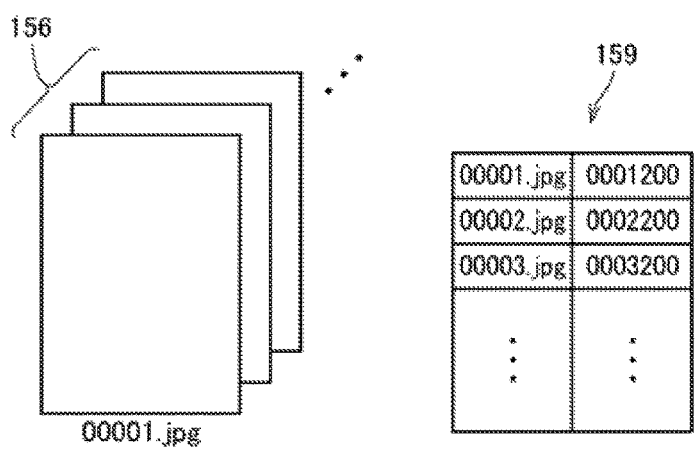

FIGS. 9A to 9C are diagrams each describing a method for storing image data used by the simulator 100 according to the present embodiment. Although an encoder value is a typical example of the information indicating the conveyor (carrier) position or displacement serving as a reference used for the image measurement in the present embodiment, any other value may be used as such information.

FIG. 9A shows an example in which an encoder value is used as a file name 157 of image data 156 to be stored or as a part of the file name 157. Referring to FIG. 9A, for example, the file name 0001200.jpg includes a main part 0001200, which corresponds to an encoder value. In processing the image data 156, the main part of the file name 157 can be extracted to determine the encoder value 0001200 serving as a reference in the image measurement of the image data 156. In this manner, the encoder value may be used in the file name of image data.

FIG. 9B shows an example in which an encoder value is used as the file name of image data to be stored or as a part of the file name. Referring to FIG. 9B, when, for example, image data in the JPEG or TIFF format is stored in accordance with the Exif (exchangeable image file format) specification, the Exif area 158 may have various pieces of information. The Exif area 158 may include an encoder value serving as a reference used for image measurement. In processing the image data 156, the information included in the Exif area 158 can be extracted to determine the encoder value that has served as the reference in the image measurement of the image data 156. In this manner, encoder value information may be added in a predetermined area of image data.

FIG. 9C shows an example in which a correspondence table 159 is provided in addition to one or more pieces of image data 156. The table includes information associated with each piece of image data 156. In the correspondence table 159, each file name of the stored image data 156 is associated with the corresponding encoder value. The correspondence table 159 can be used to easily determine the encoder value that has served as the reference in the image measurement of the image data to be stored.

G. System Model Creation and Coordinate Systems

A process for creating the model of the system to be simulated will now be described. The process for creating the system model is typically performed by the model construction module 182 (FIG. 6). This process corresponds to the reception of the setting of the system model shown in FIG. 7 described above (step S2).

A user may directly create the system model to be simulated on an edit screen provided by the simulator 100, or may load preliminary generated design data (computer aided design (CAD) data) into the simulator to create the system model. When data for the system model generated in the past can be used, the user may edit the past data to create the system model.

The simulator 100 according to the present embodiment may use any method to create the model system.

Figure 10:
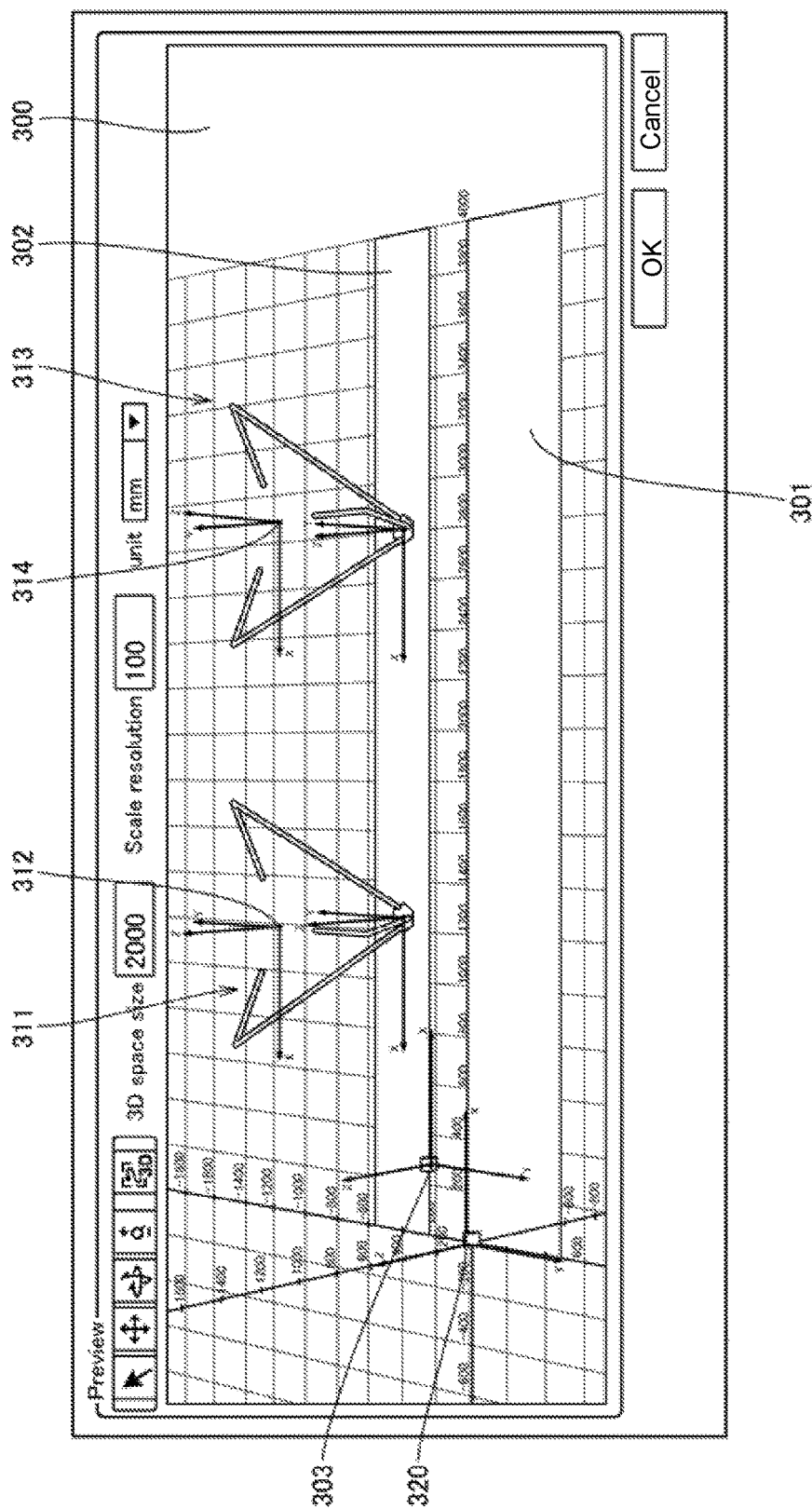
FIG. 10 is a diagram showing an example user interface screen for a system model provided by the simulator according to the embodiment.

FIG. 10 is a diagram showing an example user interface screen for the system model provided by the simulator 100 according to the present embodiment. For ease of explanation, FIG. 10 shows a system model that performs a simple pick-and-place operation.

More specifically, the user interface screen shown in FIG. 10 shows two conveyors 301 and 302 arranged parallel to each other in a three-dimensional virtual space 300. Two robots 311 and 313 are arranged in correspondence with predetermined positions on the conveyor 302. This system model is used for an application in which workpieces are transported by the conveyor 301 from left to right in the drawing, and the robots 311 and 313 each pick up a target workpiece and place the workpiece on the conveyor 302. In the user interface screen shown in FIG. 10, an object in the three-dimensional virtual space 300 can be rendered in any direction. More specifically, a user can freely change a point of view for rendering in the user interface screen.

Figure 11:
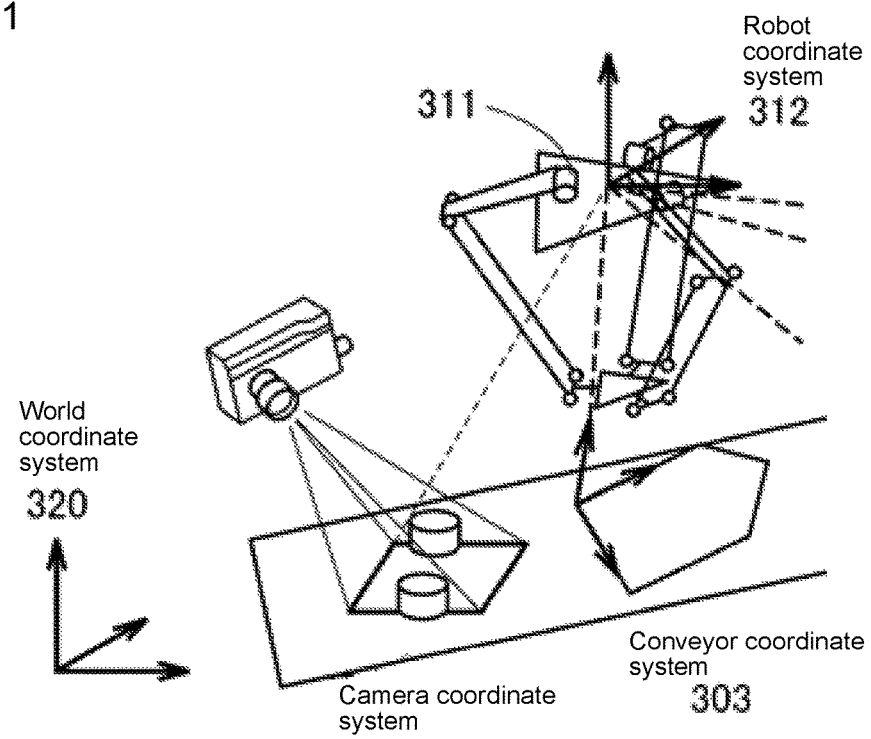
FIG. 11 is a schematic diagram describing the coordinate systems defined in the three-dimensional virtual space provided by the simulator according to the embodiment.

The coordinate systems used in the system model shown in FIG. 10 will now be described. FIG. 11 is a schematic diagram describing the coordinate systems defined in the three-dimensional virtual space provided by the simulator 100 according to the present embodiment.

As shown in FIG. 11, the three-dimensional virtual space 300 includes X, Y, and Z axes defining a world coordinate system 320. The world coordinate system 320 serves as a reference coordinate system for defining the positions of components of the system model.

To allow tracking of a workpiece transported on the conveyors 301 and 302, the controller (controller simulator 160 in FIG. 6) uses a conveyor coordinate system 303 that includes the initial position of each of the conveyors 301 and 302 as the origin. The conveyor coordinate system 303 is a coordinate system defined for a conveyor included in the system model. The conveyor coordinate system 303 includes three axes in three directions, which are the transport direction of the conveyors 301 and 302, the direction orthogonal to the transport direction, and the direction orthogonal to the transporting surfaces of the conveyors 301 and 302.

The robots 311 and 313 may have robot coordinate systems 312 and 314, which are defined independently of each other for controlling the corresponding robots. The robot coordinate systems 312 and 314 are defined for the robots 311 and 313 in the system model, and have the installation positions of the robots 311 and 313 as their origins. The robot coordinate systems 312 and 314 are used to control the behavior of the robots 311 and 313 as viewed from a robot controller. When the robots 311 and 313 have pickup jigs mounted on their ends, tool coordinate systems having the ends of the robots 311 and 313 as their origins may further be defined.

The simulator 100 preliminarily calculates calibration parameters for transforming coordinates in one coordinate system to coordinates in another coordinate system, among the multiple coordinate systems shown in FIG. 11. Examples of such calibration parameters include coefficients A to F for transforming the coordinates (x, y) in the camera coordinate system into the coordinates (X, Y) in the robot coordinate system.

$$X = A \cdot x + B \cdot y + C$$

$$Y = D \cdot x + E \cdot y + F$$

Similar coefficients are also calculated for other coordinate systems.

Additionally, the transporting operation of a carrier (typically, a conveyor) is to be reproduced in the three-dimensional virtual space, and thus parameters for the transporting operation are also calculated. More specifically, the simulator 100 calculates a transform coefficient used for transforming a unit movement of the workpiece transporting carrier (conveyor) in the created system into the moving speed of the target (workpiece) in the created system. The transform coefficient includes displacements of the workpiece in X-direction and Y-direction per unit movement of the conveyor (typically, per pulse from the encoder). For example, when an encoder generates one pulse per rotation, the integrated value of pulses from the encoder is calculated as the encoder value. In other words, one pulse is equivalent to an increment of 1 in the encoder value. Such movements are used to calculate the chronological changes of a workpiece when the behavior of the created system is reproduced.

The transform coefficient is calculated based on the tilting of the conveyor with respect to the robot coordinate system.

Figure 12:
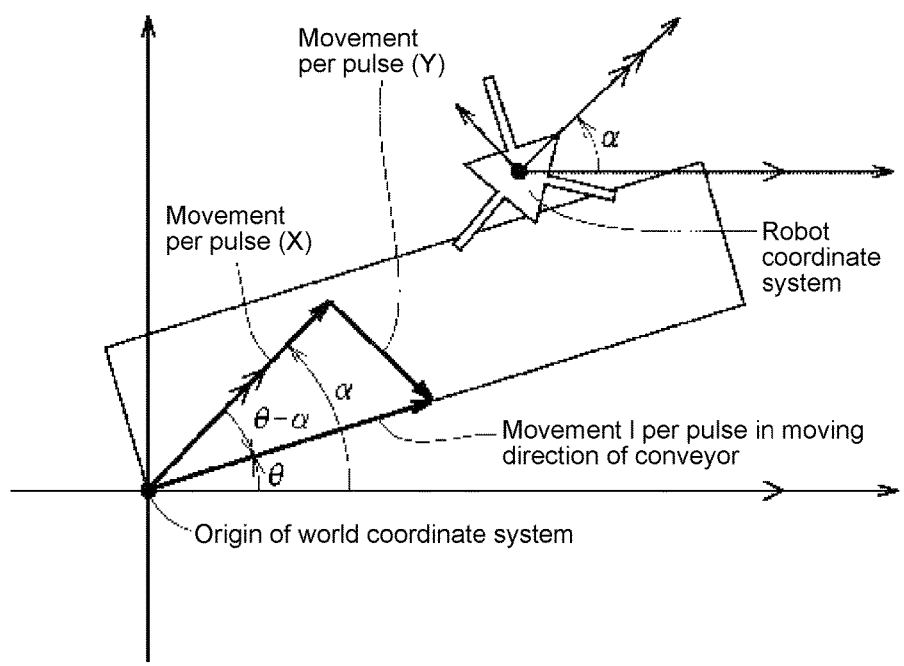
FIG. 12 is a schematic diagram describing the procedure for calculating the movement per pulse in the simulator according to the embodiment.

FIG. 12 is a schematic diagram describing the procedure for calculating the movement per pulse in the simulator 100 according to the present embodiment. In FIG. 12, the conveyor and the robot are rotated about the Z axis of the world coordinate system. When the conveyor rotates about the Z axis by a rotation angle θ and the robot rotates about the Z axis by a rotation angle α, the movement per pulse is calculated in the manner described below. In the formulas below, I is the movement per pulse in the moving direction of the conveyor.

Movement ($X$) in $X$-direction per pulse=$I$×cos(θ−α)

Movement ($Y$) in $Y$-direction per pulse=$I$×sin(θ−α)

As described above, the movement per pulse may be calculated by applying (θ−α) to the movement per pulse in the moving direction of the conveyor.

FIG. 12 shows the example in which the conveyor and the robot are rotated about the Z axis of the world coordinate system for ease of explanation. In the actual system model, the conveyer and the robot may be rotated about the X axis and the Y axis in addition to the Z axis. The calculation described below thus reflects the rotation angle for each axis.

For a typical actual system model, for example, the conveyor is tilted by a rotation angle θx about the X axis, by a rotation angle θy about the Y axis, and by a rotation angle θz about the Z axis of the world coordinate system. The robot is tilted by a rotation angle αx about the X axis, by a rotation angle αy about the Y axis, and by a rotation angle αz about the Z axis of the world coordinate system.

A unit matrix of 3×3 is rotated about the X axis by an angle (θy−αy), by an angle (θx−αx) about the Y axis, and by an angle (θz−αz) about the Z axis. This generates a rotation matrix.

The movement I per pulse in the moving direction of the conveyor may be obtained from the initial setting value. Thus, the coordinates X and Y calculated by multiplying the rotation matrix and the local coordinate axis (I, 0, 0) of the system model correspond to the movement (X) in X-direction per pulse and the movement (Y) in Y-direction per pulse as described below. The values indicating the movement are in millimeters.

Movement ($x,y,z$)=rotation matrix×($I$,0,0)

Movement ($X$) in $X$-direction per pulse=movement ($x$) (mm/pulse)

Movement ($Y$) in $Y$-direction per pulse=movement ($y$) (mm/pulse)

The movement (X) in X-direction per pulse and the movement (Y) in Y-direction per pulse, which are yielded from the above calculation process, are calculated as transform coefficients.

H. Calculating Target Position and Position Correction

The process for calculating the position of a target (workpiece) and its correction process will now be described.

h1: Target Position Calculation

Figure 13:
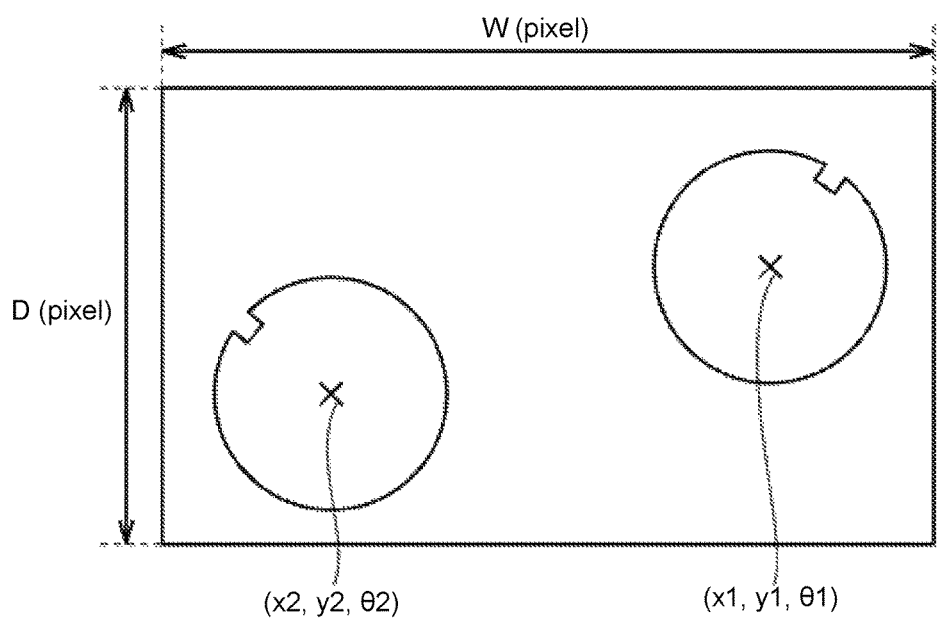
FIG. 13 is a diagram describing the measurement results obtained by a visual sensor simulator included in the simulator according to the embodiment.

FIG. 13 is a diagram describing the measurement results obtained by the visual sensor simulator 150 included in the simulator 100 according to the present embodiment. With reference to FIG. 13, the visual sensor simulator 150, which simulates the visual sensor 220, performs image measurement of image data including a plurality of pixels, and thus yields measurement results defined using the pixel values. FIG. 13 shows the results of pattern matching with any pre-registered image patterns. The image data includes two objects matching pre-registered image patterns. The output measurement results are the values (x1, y1, θ1) and (x2, y2, θ2). The measurement results include the positions of objects matching the pre-registered image patterns (both defined by pixel values), and the rotation angles (attitude) with respect to the pre-registered image patterns.

To fit these measurement results output as the coordinates included in the image data to the system model created in the three-dimensional virtual space, the coordinates in the camera coordinate system are transformed into the coordinates in the world coordinate system or the conveyor coordinate system using the calibration parameters (coefficients A to F).

The measurement results (including the detected workpiece position) output from the visual sensor simulator 150 are transformed into the coordinates in the robot coordinate system, and input into the controller simulator 160. To reproduce the behavior of the created system, the coordinates in the robot coordinate system are transformed into the corresponding coordinates in the world coordinate system in the three-dimensional virtual space 300, in which the system model is defined. Parameters for transforming the coordinates in the robot coordinate system into the coordinates in the world coordinate system can be calculated in the same manner as described above, or with the same procedure as the procedure for calculating parameters for transforming the coordinates in the camera coordinate system into the coordinates in the robot coordinate system. The simulator 100 can use coefficients A1 to F1 for transforming the coordinates (x, y) in the camera coordinate system into the coordinates (X, Y) in the world coordinate system. The simulator 100 can thus calculate the initial display position of the workpiece at the input into the controller simulator 160 based on the coordinates (x, y) of the workpiece detected by the visual sensor simulator 150 in the manner described below.

$$\text{Workpiece initial display position } (X) = A1 \times x + B1 \times y + C1$$

$$\text{Workpiece initial display position } (Y) = D1 \times x + E1 \times y + F1$$

After the initial display, the display position of each workpiece is sequentially updated in accordance with changes in the encoder value. The display position is updated in this manner to reproduce the workpiece that is being transported on the conveyor.

h2: Correcting Position of Target

Figure 14A:
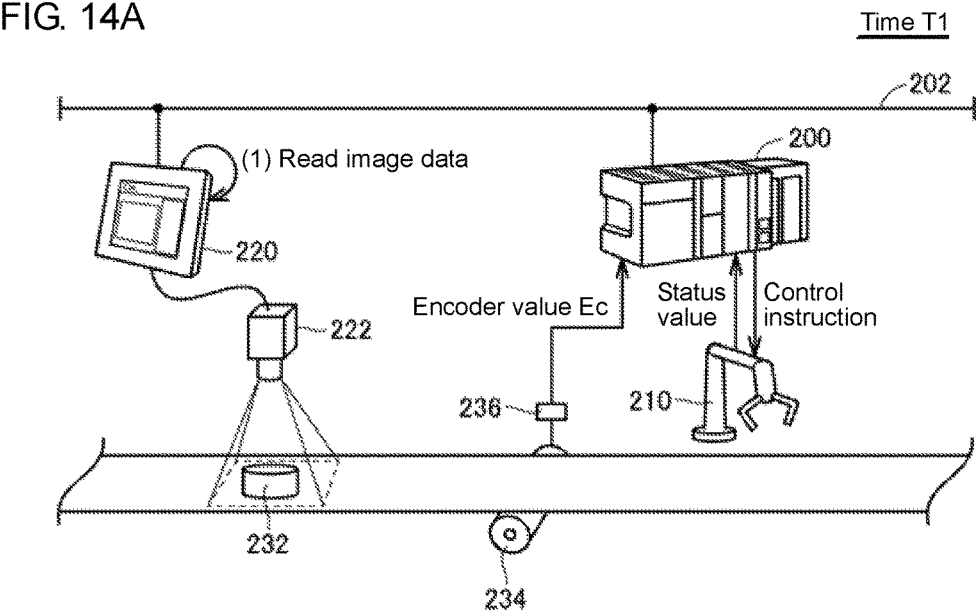
FIGS. 14A and 14B are schematic diagrams each describing a positional deviation of a target in the conveyor tracking system shown in FIGS. 1 to 3.
Figure 14B:
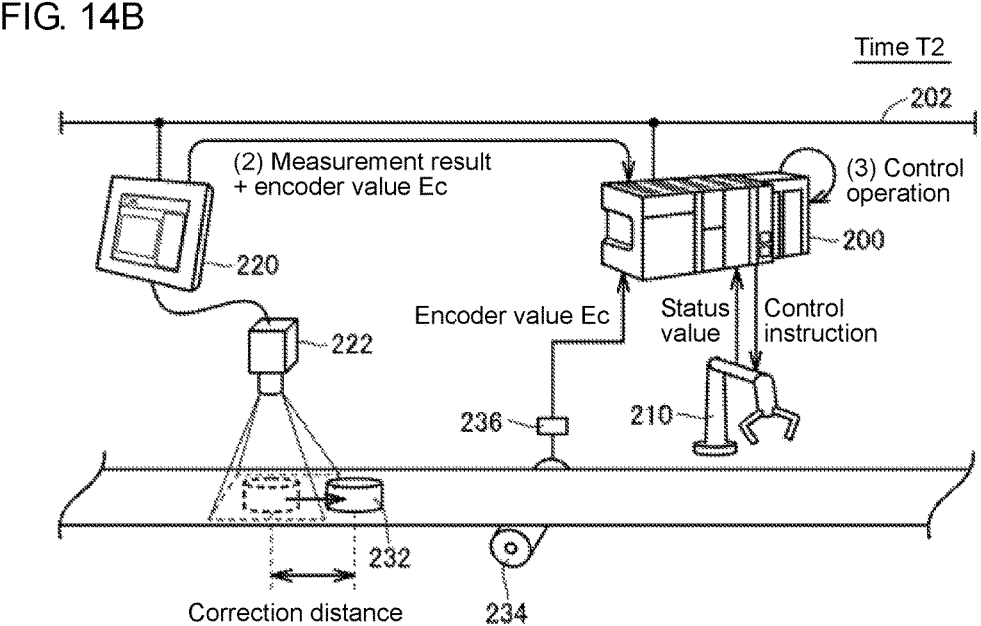

FIGS. 14A and 14B are schematic diagrams each describing a positional deviation of a target in the conveyor tracking system shown in FIGS. 1 to 3. FIG. 14A shows the system in which the workpiece 232 is captured by the imaging unit 222, and the image data is read. The process shown in FIG. 14A corresponds to the simulation in which the visual sensor simulator 150 in the simulator 100 reads image data. In FIG. 14B, the visual sensor 220 reads image data from the imaging unit 222, performs image measurement, and transmits the measurement results to the controller 200. The process shown in FIG. 14B corresponds to the simulation in which the controller simulator 160 receives the measurement results from the visual sensor simulator 150 and executes a predetermined control operation based on the measurement results.

The visual sensor 220 uses some time to read image data, perform image measurement, and transmit the measurement results to the controller 200. For an image of a target (workpiece 232) captured by the imaging unit 222 at time T1, the controller 200 will start a control operation at time T2 for the image data based on the image measurement results.

During this delay time between time T1 and time T2, the workpiece 232 moves by a distance corresponding to the delay time. The distance moved by the workpiece 232 between time T1 and time T2 is to be corrected. The distance to be corrected by the visual sensor simulator 150 (visual sensor 220) will also be referred to as a correction distance.

In FIGS. 14A and 14B, time T1 corresponds to a reference for the image measurement performed in response to a read instruction (trigger signal). To correct the distance, as shown in FIG. 6 and FIGS. 14A and 14B, the visual sensor simulator 150 outputs, to the controller simulator 160, an encoder value indicating the reference used in the image measurement to generate the measurement results in addition to the measurement results. More specifically, the visual sensor simulator 150 outputs, to the controller simulator 160, the measurement results together with the information indicating the conveyor (carrier) position or displacement associated with the image data used to obtain the measurement results.

The controller simulator 160 calculates the distance moved by the workpiece from the reference timing in the image measurement based on the difference between the current encoder value and the encoder value provided together with the measurement results. More specifically, the controller simulator 160 executes the control operation using the position of the workpiece (target) in the three-dimensional virtual space corrected based on the information indicating the conveyor (carrier) position or displacement provided together with the measurement results.

More specifically, the controller simulator 160 subtracts the encoder value Et provided together with the measurement results from the encoder value Ec at the start of the control operation or during execution of an instruction in the control operation. The controller simulator 160 also calculates the correction distance using the preliminarily calculated transform coefficient corresponding to a unit movement of the conveyor. More specifically, the correction distance is calculated using the formulas below.

$$\text{Correction distance in } X\text{-direction} = (Ec - Et) \times (\text{movement in } X\text{-direction per pulse}) (X) \text{ (mm/pulse)}$$

$$\text{Correction distance in } Y\text{-direction} = (Ec - Et) \times (\text{movement in } Y\text{-direction per pulse}) (X) \text{ (mm/pulse)}$$

The controller simulator 160 calculates the amount of correction in X-direction and the amount of correction in Y-direction assuming that the conveyor coordinate system is tilted with respect to the world coordinate system (sharing the same Z-axis). When the two coordinate systems share the same X-axis and/or the same Y-axis in addition to the Z-axis, the correction distance is equal to the movement along any particular axis.

In this manner, the controller simulator 160 calculates the correction distance (amount of correction) for the position of the target based on the difference between the encoder value provided together with the measurement results (information indicating the position or the displacement of the carrier) and the encoder value during the control operation (information indicating the current position or displacement of the carrier). The controller simulator 160 corrects the position of the workpiece at each timing using the correction distance, and generates a control instruction for the robot.

I. Displaying Simulation Results

The process for displaying the simulation results will now be described. The process for displaying the simulation results, or the process for reproducing the behavior of the system model, is typically performed by the reproduction module 170 (FIG. 6). This process corresponds to the reproduction of the behavior of the system model (step S24) shown in FIG. 7 described above.

Figure 15:
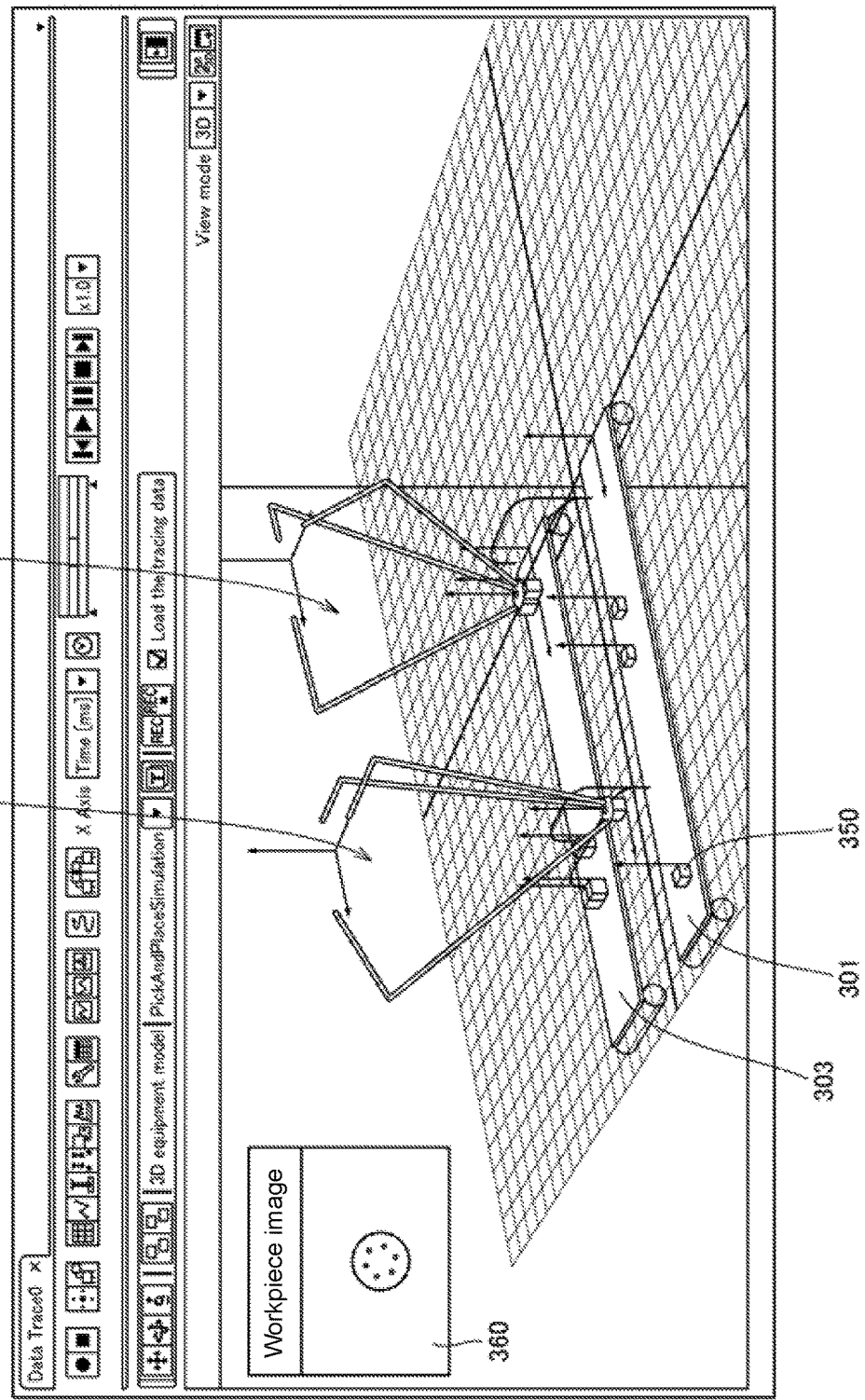
FIG. 15 is a diagram showing an example user interface screen for reproducing the behavior of the system provided by the simulator according to the embodiment.

FIG. 15 is a diagram showing an example user interface screen for reproducing the behavior of the system provided by the simulator 100 according to the present embodiment. With reference to FIG. 15, the behavior of the created system is reproduced based on the results of a control operation executed using the measurement results input from the visual sensor simulator 150. More specifically, the positions and the attitudes of the robots 311 and 313 are updated sequentially based on a control instruction obtained through the control operation executed in the controller simulator 160. This enables observation of the movement of the robots 311 and 313.

The user interface screen also displays the workpiece 350 in the created system model based on the information about the workpiece recognized by the visual sensor simulator 150. The workpiece 350 appears to move in response to the movement of the conveyors 301 and 303. The position of the workpiece 350 changes in accordance with the pick-and-place operation performed by each of the robots 311 and 313. When the image measurement performed by the visual sensor simulator 150 includes recognizing the workpiece using the pre-registered image pattern as described above, the reproduction module 170 may then display, in the system, each workpiece recognized in the visual sensor simulator 150, and may update the position of the workpiece over time.

Tracking and displaying the workpiece 350 in this manner allows the user to easily recognize the behavior of the created system.

The user interface screen also displays measurement results 360 including the input image used for the image measurement performed by the visual sensor simulator 150. The measurement results 360 appear when the behavior of the system is reproduced. In other words, the reproduction module 170 displays the behavior of the created system together with the image data that has undergone the image measurement. Additionally, the measurement results from the visual sensor simulator 150 may also be output together with the image data used to obtain the measurement results. In this case, the measurement results may be superimposed on the image data, or the input image data and the measurement results may appear side by side.

Displaying the simulation image and the measured image simultaneously in this manner allows the user to easily determine whether image measurement of each target has been performed correctly.

In the user interface screen shown in FIG. 15, an object included in a three-dimensional virtual space can be rendered in any direction. More specifically, a user can freely change a point of view for rendering in the user interface screen. The user can also freely set the duration of the reproduction time and the reproduction speed.

The simulation results may be displayed after the display position of the workpiece is corrected as appropriate. For example, when trace data output from the controller simulator 160 includes information indicating the position of the workpiece corrected using the correction distance described above, the position information can be directly used for displaying the simulation results. When the information indicating the workpiece position has not been corrected using a correction distance, the initial display position of the workpiece or other information may be corrected in the same manner as described above for the calculation of the correction distance. The simulation results may then be reproduced based on the corrected information.

In this case, the reproduction module 170 corrects the display position of the target (workpiece) based on the information indicating the position or displacement of the carrier (conveyor) provided together with the measurement results. The reproduction module 170 typically updates the display position of each component in the created system in a manner associated with the encoder value from the encoder 236. When, for example, the measurement results used for trace data calculated and associated with an encoder value have been generated through image recognition using image data associated with a different encoder value, the display position of the workpiece is corrected based on the difference between the target encoder value and the encoder value provided together with the image data used for the image recognition.

The correction process described above allows the workpiece to appear at a more accurate position when the simulation results are reproduced. Further, the timing for image measurement is simulated more precisely.

K. Modifications

Although the structure shown in FIG. 6 includes the encoder emulator 190 for emulating an encoder separate from the controller simulator 160, the encoder emulator 190 and the controller simulator 160 may be an integrated single unit. More specifically, the program causing the control operation executed by the controller simulator 160 may include the processing for updating an encoder value. In another modification, the controller simulator 160 may execute the control program 162 in parallel with the program for implementing the encoder emulator 190.

In another modification, the function of the encoder emulator 190 may be implemented by an external device or a real encoder.

More specifically, the encoder 236 shown in FIGS. 1 to 3, which detects the operation of the carrier (conveyor 230) independent of the controller 200 and the visual sensor 220, may not be directly associated with the operations of the controller 200 and the visual sensor 220, and may thus be implemented in any form.

L. Advantages

The simulator 100 according to the present embodiment allows more efficient simulation using preliminary obtained image data for a target such as a workpiece. Further, the timing for image measurement of such preliminary obtained image data is simulated more precisely.

The embodiments disclosed herein should be considered to be in all respects illustrative and not restrictive. The scope of the present invention is determined not by the description given above but by the claims, and is construed as including any modification that comes within the meaning and range of equivalency of the claims.

REFERENCE SIGNS LIST 1, 2 conveyor tracking system
100 simulator
102 processor
104 main memory
106 input unit
108 display unit
110 network interface
112 optical drive
114 optical disc
116 communication interface
118 internal bus
120 hard disk drive
124 simulation program
140 image data group
150 visual sensor simulator
152 setting parameter
154 storage unit
156 image data
157 file name
158 Exif area
159 correspondence table
160 controller simulator
162 control program
170 reproduction module
172 three-dimensional design data
180 user interface module
182 model creating module
190 encoder emulator 200 controller
202 network
210, 311 robot
220 visual sensor
222 imaging unit
230, 301, 302 conveyor
232, 350 workpiece
234 drive roller
236 encoder

The invention claimed is:

1. A simulator for estimating a behavior of a system, the simulator comprising:
a memory comprising a storage unit that stores preliminarily obtained image data, and
a processor configured with a program to perform operations comprising:
operation as a creating unit configured to virtually create a system comprising a carrier in a three-dimensional virtual space, the created system comprising a visual sensor virtually located at a first position on a transporting path associated with the carrier, and a processing device virtually located at a second position on the transporting path;
operation as a measurement unit configured to perform image measurement of the preliminarily obtained image data, the image measurement corresponding to processing performed using the visual sensor;
operation as an execution unit configured to execute a control operation for:
generating a control instruction directed to the processing device and time-series data comprising trace data associated with the control operation, the control instruction and the time-series data generated based on a measurement result obtained by the measurement unit; and
generating a read instruction directed to the measurement unit for reading the image data; and
operation as an encoder emulator configured to generate information indicating a position or a displacement of the carrier along the transporting path at a time when the read instruction is generated, wherein
the processor is configured with the program to perform operations further comprising:
storing, in the storage unit, the image data read in response to the read instruction in a manner corresponding with information indicating the position or the displacement of the carrier at the time when the read instruction is generated, the position or the displacement serving as a reference for the image measurement performed in response to the read instruction; and
operation as a reproduction unit configured to reproduce a behavior of the created system based on the time-series data for the control operation output from the execution unit and the information corresponding with the image data stored in the storage unit.

2. The simulator according to claim 1, wherein the processor is configured with the program to perform operations such that operation as the measurement unit comprises operation as the measurement unit that outputs, to the execution unit, the measurement result together with information indicating the position or the displacement of the carrier corresponding with the image data used to generate the measurement result.

3. The simulator according to claim 2, wherein the processor is configured with the program to perform operations such that operation as the execution unit comprises operation as the execution unit that executes the control operation using a position of a target in the three-dimensional virtual space corrected based on the information indicating the position or the displacement of the carrier provided together with the measurement result.

4. The simulator according to claim 3, wherein the processor is configured with the program to perform operations such that operation as the execution unit comprises operation as the execution unit that calculates an amount of correction for the position of the target based on a difference between information indicating the position or the displacement of the carrier provided together with the measurement result and information indicating the position or the displacement of the carrier during execution of the control operation.

5. The simulator according to claim 1, wherein the processor is configured with the program to perform operations such that operation as the reproduction unit comprises operation as the reproduction unit that displays the behavior of the created system and the image data that has undergone the image measurement.

6. The simulator according to claim 1, wherein the processor is configured with the program to perform operations such that operation as the reproduction unit comprises operation as the reproduction unit that corrects a display position of a target based on the information indicating the position or the displacement of the carrier provided together with the measurement result.

7. The simulator according to claim 1, wherein the processor is configured with the program to perform operations such that storing, in the storage unit comprises associating the information with a file name of the image data or an area included in the image data.

8. A simulation method implemented by a computer for estimating a behavior of a system, the method comprising:
virtually creating a system including a carrier in a three-dimensional virtual space, the created system including a visual sensor virtually located at a first position on a transporting path associated with the carrier, and a processing device virtually located at a second position on the transporting path;
performing image measurement of preliminarily obtained image data, the image measurement corresponding to processing performed using the visual sensor;
executing a control operation for generating a control instruction directed to the processing device and time-series data comprising trace data associated with the control operation, the control instruction and the time-series data generated based on a measurement result obtained from the image measurement and for generating a read instruction for reading the image data to start the image measurement;
generating information indicating a position or a displacement of the carrier along the transporting path at a time when the read instruction is generated;
storing the image data read in response to the read instruction in a manner corresponding with information indicating the position or the displacement of the carrier at a time when the read instruction is generated, the position or the displacement serving as a reference for the image measurement performed in response to the read instruction; and
reproducing a behavior of the created system based on the time-series data for the control operation output as a result of the executing and information corresponding with the stored image data.

9. A non-transitory computer readable medium, having stored thereon, a simulation program for estimating a behavior of a system, the simulation program, when read and executed, causing a computer to perform operations comprising:
  virtually creating a system including a carrier in a three-dimensional virtual space, the created system including a visual sensor virtually located at a first position on a transporting path associated with the carrier, and a processing device virtually located at a second position on the transporting path;
  performing image measurement of preliminarily obtained image data, the image measurement corresponding to processing performed using the visual sensor;
  executing a control operation for generating a control instruction directed to the processing device and time-series data comprising trace data associated with the control operation, the control instruction and the time-series data generated based on a measurement result obtained from the image measurement and for generating a read instruction for reading the image data to start the image measurement;
  generating information indicating a position or a displacement of the carrier along the transporting path at a time when the read instruction is generated
  storing the image data read in response to the read instruction in a manner corresponding with information indicating the position or the displacement of the carrier at a time when the read instruction is generated, the position or the displacement serving as a reference for the image measurement performed in response to the read instruction; and
  reproducing a behavior of the created system based on the time-series data for the control operation output as a result of the executing and information corresponding with the stored image data.

* * * * *